US010140249B2

(12) United States Patent
Baron et al.

(10) Patent No.: US 10,140,249 B2
(45) Date of Patent: *Nov. 27, 2018

(54) APPROXIMATE MESSAGE PASSING WITH UNIVERSAL DENOISING

(71) Applicant: North Carolina State University, Raleigh, NC (US)

(72) Inventors: Dror Baron, Raleigh, NC (US); Yanting Ma, Raleigh, NC (US); Junan Zhu, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,534

(22) Filed: Jun. 3, 2016

(65) Prior Publication Data

US 2016/0358316 A1    Dec. 8, 2016

Related U.S. Application Data

(60) Provisional application No. 62/171,757, filed on Jun. 5, 2015.

(51) Int. Cl.
 *G06K 9/36* (2006.01)
 *G06F 17/11* (2006.01)

(52) U.S. Cl.
 CPC .................... *G06F 17/11* (2013.01)

(58) Field of Classification Search
 CPC . G06F 17/11; G06T 5/10; G06T 5/002; G06T 2200/04; G06T 2207/20182; G06T 2207/20064; G06K 9/3241; G06K 9/6255; H04N 5/357; H04N 5/23277; H04N 5/23232; H04N 19/48; H04N 2209/046

USPC ....... 382/155, 159, 250, 264, 265, 275, 276, 382/299, 300; 348/46, 208.6, 231.2, 250

See application file for complete search history.

(56) References Cited

U.S. PATENT DOCUMENTS

| 8,103,068 | B2 | 1/2012 | Zabih et al. |
| 8,139,656 | B2 | 3/2012 | Shental et al. |
| 8,300,979 | B2 | 10/2012 | Ordentlich et al. |
| 9,607,362 | B2* | 3/2017 | Baron ..................... G06T 5/002 |
| 2002/0129038 | A1 | 9/2002 | Cunningham |
| 2006/0239336 | A1 | 10/2006 | Baraniuk |

(Continued)

OTHER PUBLICATIONS

Ma et al., (NPL document titled : Compressive video sampling with approximate message passing decoding).*

(Continued)

*Primary Examiner* — Sheela C Chawan
(74) *Attorney, Agent, or Firm* — Thomas | Horstemeyer, LLP (57) ABSTRACT

Various examples of methods and systems are provided for approximate message passing with universal denoising. In one example, a method includes applying an approximate message passing (AMP) conversion framework to a plurality of substantially linear measurements to produce a plurality of scalar measurements; applying a denoiser algorithm to the plurality of scalar measurements to generate a plurality of denoised scalar measurements; and applying a conversion term to the plurality of denoised scalar measurements to convert the plurality of denoised scalar measurements to a plurality of denoised substantially linear measurements.

20 Claims, 5 Drawing Sheets

(56) References Cited

U.S. PATENT DOCUMENTS

| 2014/0126808 | A1 | 5/2014 | Geisler |
| 2014/0185956 | A1 | 7/2014 | Kawata |
| 2014/0219552 | A1 | 8/2014 | Porikli |
| 2015/0036943 | A1 | 2/2015 | Lin |
| 2015/0206285 | A1 | 7/2015 | Pajak |
| 2015/0235350 | A1 | 8/2015 | Kwan |

OTHER PUBLICATIONS

Dong et al., (NPL document titled : Sparsity-based image denoising via dictionary learning and structural clustering).*
Hirakawa Ketal: "An empirical Bayes EM-wavelet unification for simultaneous denoising, interpolation, and/or demosaicing" International Conference on Image Processing IEEE Piscataway, NJ, USA, Oct. 2006; (Oct. 2006), p. 4 pp. XP002469894 ISBN: 1-4244-0481-9.
Tan et al, Compressive Imaging via Approximate Message Passing With Image Denoising, IEEE Transactions on Signal Processing, vol. 63, No. 8, Apr. 15, 2015 2085.
M. Kivanc Mihcak, I. Kozintsev, K. Ramchandran and P. Moulin, "Low-complexity image denoising based on statistical modeling of wavelet coefficients," in IEEE Signal Processing Letters, vol. 6, No. 12, pp. 300-303, Dec. 1999.
N. Gupta, M. N. S. Swamy and E. I. Plotkin, "Wavelet domain-based video noise reduction using temporal discrete cosine transform and hierarchically adapted thresholding," in I ET Image Processing, vol. 1, No. 1, pp. 2-12, Mar. 2007.
J. Ma, G. G. Plonka and M. Y. Hussaini, "Compressive Video Sampling With Approximate Message Passing Decoding," in IEEE Transactions on Circuits and Systems for Video Technology, vol. 22, No. 9, pp. 1354-1364, Sep. 2012.
Angelini et al, Compressed sensing with sparse, structured matrices, Fiftieth Annual Allerton Conference Allerton House, U IUC, Illinois, USA Oct. 1-5, 2012.
W. Dong, X. Li, L. Zhang and G. Shi, "Sparsity-based image denoising via dictionary learning and structural clustering," Computer Vision and Pattern Recognition (CVPR), 2011 IEEE Conference on, Providence, RI, 2011, pp. 457-464.
Aguello H, et al. Higher-order computational model for coded aperture spectral imaging. Applied Optics I vol. 52, No. 10 I Apr. 1, 2013.
Bayati M and Montanari A. The Dynamics of Message Passing on Dense Graphs, with Applications to Compressed Sensing. IEEE Transactions on Information Theory, vol. 57, No. 2, Feb. 2011.
Donoho DL and Johnstone IM. Ideal spatial adaptation by wavelet shrinkage. Biometrika (1994), 81, 3, pp. 425-455.
Metzler CA et al. From Denoising to Compressed Sensing. Arxiv preprint arxiv: 1406.4175v2, Jun. 2014.
Mihcak MK et al. Low-Complexity Image Denoising Based on Statistical Modeling of Wavelet Coefficients. IEEE Signal Processing Leiters, vol. 6, No. 12, Dec. 1999.
Tan J et al. (2015) Compressive Imaging via Approximate Message Passing with Image Denoising. IEEE Signal Processing, vol. 63(8) 2085-2092.
Tan Jet al. (2014) Compressive Imaging via Approximate Message Passing with Wavelet-Based Image Denoising. IEEE Global Conference on Signal and Information Processing. pp. 424-428.
Y. Ma, J. Zhu, and D. Baron, "Compressed Sensing via Universal Denoising and Approximate Message Passing," Proc. 52d Allerton Conf. Communication, Control, and Computing, Monticello, IL, Oct. 2014. (paper and power point).
Y. Ma, J. Zhu, and D. Baron, "Universal Denoising and Approximate Message Passing," Inf. Theory Applications Workshop, San Diego, CA, Feb. 2015 (power point).

* cited by examiner

APPROXIMATE MESSAGE PASSING WITH UNIVERSAL DENOISING

CROSS REFERENCE TO RELATED APPLICATIONS

This application claims priority to, and the benefit of, U.S. provisional application entitled "APPROXIMATE MESSAGE PASSING WITH UNIVERSAL DENOISING" having Ser. No. 62/171,757, filed Jun. 5, 2015, which is hereby incorporated by reference in its entirety.

STATEMENT REGARDING FEDERALLY SPONSORED RESEARCH OR DEVELOPMENT

This invention was made with government support under grant W911N F-14-1-0314 awarded by the U.S. Army Research Office and grant 1217749 awarded by the National Science Foundation. The Government has certain rights in the invention.

BACKGROUND

An inverse problem is a general framework that is used to convert observed measurements into information about a physical object or system. Inverse problems arise in many fields including computer vision, natural language processing, machine learning, statistics, statistical inference, geophysics, medical imaging, remote sensing, ocean acoustic tomography, nondestructive testing, astronomy, physics, etc. In many cases, the observed measurements are obtained with noise, which should be considered during signal reconstruction.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various examples related to approximate message passing with universal denoising. Reference will now be made in detail to the description of the embodiments as illustrated in the drawings, wherein like reference numbers indicate like parts throughout the several views.

Many scientific and engineering problems can be approximated as linear systems of the form $$y = Ax + z \quad (1)$$

where $x \in \mathbb{R}^N$ is the unknown input signal, $A \in \mathbb{R}^{M \times N}$ is the matrix that characterizes the linear system, and $z \in \mathbb{R}^M$ is measurement noise. The goal is to estimate x from the measurements y given A and statistical information about z. When M<<N, the setup is known as compressed sensing (CS). By posing a sparsity or compressibility requirement on the signal, it is possible to accurately recover x from an ill-posed linear system. However, when the signal is dense or the noise is substantial, M may need to be greater than N.

One popular scheme to solve the CS recovery problem is LASSO (also known as basis pursuit denoising): $\hat{x} = \arg\min_{x \in \mathbb{R}^N} \frac{1}{2}\|y - Ax\|_2^2 + \gamma \|x\|_1$, where $\|\cdot\|_p$ denotes the $l_p$-norm, and $\gamma$ reflects a trade-off between the sparsity $\|x\|_1$ and residual $\|y - Ax\|_2^2$. This approach does not require statistical information about x and z, and can be conveniently solved via standard convex optimization tools or the approximate message passing (AMP) algorithm. However, the reconstruction quality is often far from optimal.

Bayesian CS recovery algorithms based on message passing usually achieve better reconstruction quality, but need to know the prior for x. For parametric signals with unknown parameters, the parameters can be inferred and the minimum mean square error (MMSE) achieved in some settings. Examples include EM-GM-AMP-MOS (expectation-maximization Gaussian-mixture approximate message passing model order selection), turboGAMP, and adaptive-GAMP (generalized approximate message passing).

Unfortunately, possible uncertainty about the statistics of the signal may make it difficult to select a prior or model class for empirical Bayes algorithms. A mismatched model can yield excess mean square error (EMSE) above the MMSE, and the EMSE can get amplified in linear inverse problems compared to that in scalar estimation problems. Universal schemes can be developed that approach the optimal Bayesian performance for stationary ergodic signals despite not knowing the input statistics. Although others have worked on CS algorithms for independent and identically distributed (i.i.d.) signals with unknown distributions, this disclosure is particularly interested in developing algorithms for signals that may not be well approximated by i.i.d. models, because real-world signals often contain dependencies between different entries. For example, a chirp sound clip can be reconstructed 1-2 dB better with models that can capture such dependencies than i.i.d. models after the signal was sparsified by a carefully chosen transform.

While approaches based on Kolmogorov complexity are theoretically appealing for universal signal recovery, they are not computable in practice. Several algorithms based on Markov chain Monte Carlo (MCMC) leverage the fact that for stationary ergodic signals, both the per-symbol empirical entropy and Kolmogorov complexity converge asymptotically almost surely to the entropy rate of the signal, and aim to minimize the empirical entropy. The best existing implementation of the MCMC approach often achieves a mean square error (MSE) that is within 3 dB of the MMSE.

Here, consider the system model defined in Equation (1), where the input signal x is generated by a stationary ergodic source. Concepts from AMP, Gaussian mixture (GM) learning for density estimation, and a universal denoising algorithm for stationary ergodic signals can be merged to address the problem. The resulting universal CS recovery algorithm will be referred to as AMP-UD (AMP with a universal denoiser). Two implementations of the AMP-UD are provided, and they compare favorably with existing approaches in terms of reconstruction quality and runtime.

Approximate message passing: AMP is an iterative algorithm that solves a linear inverse problem by successively converting matrix channel problems into scalar channel denoising problems with additive white Gaussian noise (AWGN). AMP has received considerable attention, because of its fast convergence and the state evolution (SE) formalism, which offers a precise characterization of the AWGN denoising problem in each iteration. AMP with separable denoisers has been rigorously proved to obey SE.

The reconstruction of signals that are not necessarily i.i.d. is examined here, and non-separable denoisers are explored. Numerical results demonstrating that SE accurately predicts the phase transition of AMP when some well-behaved non-separable minimax denoisers are applied have been provided in "Accurate prediction of phase transitions in compressed sensing via a connection to minimax denoising" by Donoho et al. (*IEEE Trans. Inf. Theory*, vol. 59, no. 6, pp. 3396-3433, June 2013). SE may also hold for AMP with a broader class of denoisers. Compressive imaging algorithms can apply non-separable image denoisers within AMP. Moreover, AMP has been applied to sparse superposition decoding, and it has been shown that SE holds for AMP with certain block-separable denoisers and that such an AMP-based decoder achieves channel capacity. A potential challenge of implementing AMP is to obtain the Onsager correction term, which involves the calculation of the derivative of a denoiser. A Monte Carlo technique may be leveraged to approximate the derivative of a denoiser when an explicit input-output relation of the denoiser is unavailable, and numerical results have shown that SE holds for AMP with such approximation.

Despite the encouraging results for using non-separable denoisers within AMP, a rigorous proof that SE holds for general non-separable denoisers has yet to appear. Numerical results showing that SE holds for non-separable Bayesian sliding-window denoisers are provided, which may increase the community's confidence about using non-separable denoisers within AMP.

Fitting Gaussian mixture models: An algorithm that employs a cost function that resembles the minimum message length (MML) criterion can be used to fit a given data sequence with a GM model, and the parameters can be learned using a modified expectation-maximization (EM) algorithm.

The GM fitting problem involves a sequence of observations q corrupted by AWGN, and the probability density function (pdf) of x can be estimated based on the GM model for q. Note that a GM convolved with Gaussian noise is still a GM in which the variance of each component is increased by the noise variance. Therefore, q can be sent to the mixture model learning algorithm, and the noise variance subtracted from each component of the estimated pdf $\hat{p}_Q$ for q to obtain $\hat{p}_x$ for x. Once $\hat{p}_x$ is available, the subsequence can be denoised by computing the conditional expectation of each entry of the subsequence of x with the estimated pdf $\hat{p}_x$ (recall that MMSE estimators rely on conditional expectation). Here, the GM learning algorithm is modified, which extends it to an i.i.d. denoiser.

Universal denoising: The denoiser for stationary ergodic signals applies a context quantization approach, where a universal denoiser for a stationary ergodic signal involves multiple i.i.d. denoisers for conditionally i.i.d. subsequences. A universal denoiser based on context quantization can achieve the MMSE asymptotically for bounded stationary ergodic signals.

A boundedness condition of the universal denoiser may be partly due to a utilized density estimation approach, in which the empirical distribution function is obtained by quantizing the bounded range of the signal. Such boundedness conditions may be undesirable in certain applications. This limitation can be overcome by replacing the density estimation approach with GM model learning. In this way, the universal denoiser does not need the input signal to be bounded, and the universal denoiser may achieve the MMSE asymptotically under some technical conditions.

Figure 1:
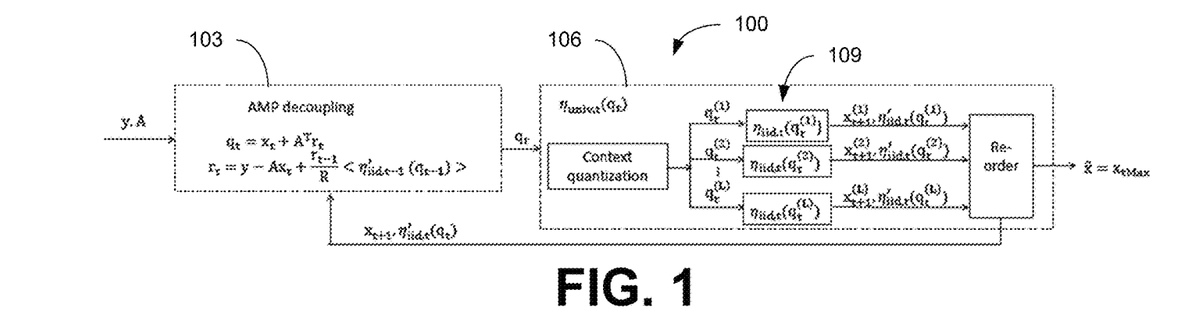
FIG. 1 is a flow chart illustrating an example of approximate message passing with universal denoising (AMP-UD) in accordance with various embodiments of the present disclosure.

Referring to FIG. 1, shown is a flow chart illustrating an example of AMP-UD 100, which employs the AMP framework 103, along with the modified universal denoiser $\eta_{univ,t}(\cdot)$ 106 with the GM-based i.i.d. denoiser $\eta_{iid,t}(\cdot)$ 109. Based on the numerical evidence that SE holds for AMP with Bayesian sliding-window denoisers and the conjecture that the universal denoiser can achieve the MMSE, the AMP-UD 100 may achieve the MMSE under some technical conditions. AMP 103 decouples the linear inverse problem into scalar channel denoising problems. In the t-th iteration, the universal denoser $\eta_{univ,t}(\cdot)$ converts stationary ergodic signal denoising into i.i.d. subsequence denoising. Each i.i.d. denoiser $\eta_{iid,t}(\cdot)$ outputs the denoised subsequence $x_{t+1}^{(l)}$ and the derivative of the denoiser $\eta'_{iid,t}(\cdot)$. The algorithm stops when the iteration index t reaches the predefined maximum tMax, and outputs $\hat{x}_{tMax}$ as the CS recovery result.

In this disclosure, AMP will be reviewed and numerical evidence provided which indicates that AMP obeys SE with non-separable denoisers. The GM fitting algorithm will be modified, and extended to form an i.i.d. denoiser. And, the universal denoiser will be extended based on context quantization to overcome the boundedness condition, and two implementations are provided to improve denoising quality. The disclosed AMP-UD algorithm will be summarized and numerical results presented.

Approximate Message Passing with Sliding-Window Denoisers

The application of non-separable Bayesian sliding-window denoisers within AMP will now be discussed, and numerical evidence that state evolution (SE) holds for AMP with this class of denoisers will be presented. Consider a linear inverse problem of Equation (1), where the measurement matrix A has zero mean i.i.d. Gaussian entries with unit-norm columns on average, and z represents i.i.d. Gaussian noise with pdf $p_z(z_i) = \mathcal{N}(z_i; 0, \sigma_z^2)$, where $z_i$ is the i-th entry of the vector z, and $\mathcal{N}(x; 0, \sigma^2)$ denotes a Gaussian pdf:

$$\mathcal{N}(x; \mu, \sigma^2) = \frac{1}{\sqrt{2\pi}\,\sigma}\exp\left(-\frac{(x-\mu)^2}{2\sigma^2}\right).$$

Note that AMP is proved to follow SE when A is a zero mean i.i.d. Gaussian matrix, but may diverge otherwise. Several techniques have been proposed to improve the convergence of AMP. Moreover, other noise distributions can be supported using generalized AMP (GAMP), and the noise distribution can be estimated in each GAMP iteration.

Starting with $x_0 = 0$, the AMP algorithm proceeds iteratively according to $$x_{t+1} = \eta_t(A^T r_t + x_t), \text{ and} \tag{2}$$

$$r_t = y - A^T x_t + \frac{1}{R} r_{t-1} \langle \eta'_{t-1}(A^T r_{t-1} + x_{t-1})\rangle, \tag{3}$$

where R=M/N represents the measurement rate, t represents the iteration index, $\eta_t(\bullet)$ is a denoising function, and $\langle u \rangle \geq 1/N \Sigma_{i=1}^{N} u_i$ for some vector $u \in \mathbb{R}^N$. The last term in Equation (3) is called the Onsager correction term in statistical physics. The empirical distribution of x is assumed to converge to some probability distribution $p_X$ on $\mathbb{R}$, and the denoising function $\eta_t(\bullet)$ is separable in the original derivation of AMP. That is, $\eta_t(u)=(\eta_t(u_1), \eta_t(u_2), \ldots, \eta_t(u_N))$ and $\eta'_t(u)=(\eta'_t(u_1), \eta'_t(u_2), \ldots, \eta'_t(u_N))$, where $\eta'_t(\bullet)$ denotes the derivative of $\eta_t(\bullet)$. A useful property of AMP is that at each iteration, the vector $A^T r_t + x_t \in \mathbb{R}^N$ in Equation (2) is equivalent to the input signal x corrupted by AWGN, where the noise variance evolves following SE in the limit of large systems (N→∞, M/N→R):

$$\sigma_{t+1}^2 = \sigma_z^2 + \frac{1}{R} MSE(\eta_t, \sigma_t^2), \quad (4)$$

where $MSE(\eta_t, \sigma_t^2) = \mathbb{E}_{X,W}[(\eta_t(X+\sigma_t W)-X)^2]$, $W \sim \mathcal{N}(0,1)$, $X \sim p_X$, and $$\sigma_0^2 = \sigma_z^2 + \frac{1}{R} \mathbb{E}[X^2].$$

Additionally, it can be convenient to use the following estimator for $\sigma_t^2$:

$$\hat{\sigma}_t^2 = \frac{1}{M} \|r_t\|_2^2. \quad (5)$$

State evolution for Bayesian sliding-window denoisers. SE allows for the calculation of the asymptotic MSE of linear systems from the MSE of the denoiser used within AMP. Therefore, knowing that SE holds for AMP with the denoisers of interest can help with the choice of a good denoiser for AMP. AMP with a wide range of non-separable denoisers can obey SE. To support this, non-separable Bayesian denoisers were constructed within a sliding-window denoising scheme for two Markov signal models, and it was shown that SE accurately predicts the performance of AMP with this class of denoisers for large signal dimension N. The rationale for examining the SE performance of sliding-window denoisers was that the context quantization based universal denoiser that will be used, resembles a sliding-window denoiser.

The mathematical model for an AWGN channel denoising problem is defined as $$q = x + v, \quad (6)$$

where $x \in \mathbb{R}^N$ is the input signal, $v \in \mathbb{R}^N$ is AWGN with pdf $p_V(v_i) = \mathcal{N}(v_i; 0, \sigma_v^2)$, and $q \in \mathbb{R}^N$ is a sequence of noisy observations.

In a separable denoiser, $x_j$ is estimated only from its noisy observation $q_j$. The separable Bayesian denoiser that minimizes the MSE is point-wise conditional expectation, $$\hat{x}_j = \mathbb{E}[X|Q=q_j] = \int x p(x|q_j) dx, \quad (7)$$

where Bayes' rule yields $$p(x|q_j) = \frac{\mathcal{N}(q_j; 0, \sigma_v^2) p_X(x)}{p_Q(q_j)}.$$

If entries of the input signal x are drawn independently from $p_X$, then Equation (7) achieves the MMSE.

When there are statistical dependencies among the entries of x, a sliding-window denoising scheme can be applied to improve performance. Two Markov sources are considered as examples that contain statistical dependencies, and highlight that the true motivation is the richer class of stationary ergodic sources.

Example source 1: In a first example, consider a two-state Markov state machine that contains states $s_0$ (zero state in which the signal entries are zero) and $s_1$ (nonzero state in which entries are nonzero). The transition probabilities are $p_{10} = p(s_0|s_1)$ and $p_{01} = p(s_1|s_0)$. In the steady state, the marginal probability of state $s_1$ is $p_{01}/(p_{01}+p_{10})$. This first example can be called source Markov-constant (or MConst for short). It is generated by the two-state Markov machine with $p_{01}=3/970$ and $p_{10}=1/10$, and in the nonzero state the signal value is the constant 1. These state transition parameters yield 3% nonzero entries in the MConst signal on average.

Example source 2: The second example is a four-state Markov switching signal (M4 for short) that follows the pattern +1, +1, −1, −1, +1, +1, −1, −1, . . . with 3% error probability in state transitions, resulting in the signal switching from −1 to +1 or vice versa either too early or too late; the four states $s_1=[-1-1]$, $s_2=[-1+1]$, $s_3=[+1-1]$, and $s_4=[+1+1]$ have equal marginal probabilities 0.25 in the steady state.

Bayesian sliding-window denoiser: Denote a block $(q_s, q_{s+1}, \ldots, q_t)$ of a sequence q by $q_s^t$ for $s<t$. The (2k+1)-Bayesian sliding-window denoiser $\eta_{MConst}$ for the MConst signal is defined as $$\eta_{MConst,j}(q_{j-k}^{j+k}) = \mathbb{E}[X_j | Q_{j-k}^{j+k} = q_{j-k}^{j+k}] \quad (8)$$
$$= \frac{p_{X_j, Q_{j-k}^{j+k}}(1, q_{j-k}^{j+k})}{p_{Q_{j-k}^{j+k}}(q_{j-k}^{j+k})},$$

and the MSE of $\eta_{MConst}$ can be shown to be $$MSE(\eta_{MConst}, \sigma_v^2) = \mathbb{E}_{X_j, Q_{j-k}^{j+k}}[(X_j - \eta_{MConst,j}(Q_{j-k}^{j+k}))^2] = \quad (9)$$
$$\int \frac{p_{X_j, Q_{j-k}^{j+k}}(0, q_{j-k}^{j+k}) p_{X_j, Q_{j-k}^{j+k}}(1, q_{j-k}^{j+k})}{p_{Q_{j-k}^{j+k}}(q_{j-k}^{j+k})} dq_{j-k}^{j+k},$$

where $$p_{X_j, Q_{j-k}^{j+k}}(x, q_{j-k}^{j+k}) = \sum \prod_{i=j-k}^{j+k} \mathcal{N}(q_i; x_i, \sigma_v^2) p_{X_{j-k}^{j+k}}(x_{j-k}^{j+k}); \quad (10)$$

the summation is over all $x_{j-k}^{j+k} \in \{0,1\}^{2k+1}$ with $x_j = x$, $$p_{Q_{j-k}^{j+k}}(q_{j-k}^{j+k}) = \sum_{x_{j-k}^{j+k}} \prod_{i=j-k}^{j+k} \mathcal{N}(q_i; x_i, \sigma_v^2) p_{X_{j-k}^{j+k}}(x_{j-k}^{j+k}), \quad (11)$$

$$p_{X_{j-k}^{j+k}}(x_{j-k}^{j+k}) = p(x_{j-k}) \prod_{i=-k}^{k-1} p(x_{j+i+1}|x_{j+i}). \quad (12)$$

To obtain the Onsager correction term $$\frac{1}{R} r_{t-1} \langle \eta'_{t-1}(A^T r_{t-1} + x_{t-1}) \rangle$$

in Equation (3), the derivative of $\eta_{MConst,j}$ needs to be calculated. It can be shown that $$\frac{\partial}{\partial q_j} \eta_{MConst,j}(q_{j-k}^{j+k}) = \frac{p_{X_j, Q_{j-k}^{j+k}}(0, q_{j-k}^{j+k}) p_{X_j, Q_{j-k}^{j+k}}(1, q_{j-k}^{j+k})}{\left(\sigma_v p_{Q_{j-k}^{j+k}}(q_{j-k}^{j+k})\right)^2}.$$

Similarly, the $(2k+1)$-Bayesian sliding-window denoiser $\eta_{M4}$ for the M4 signal is defined as $$\eta_{M4,j}(q_{j-k}^{j+k}) = \mathbb{E}[X_j \mid Q_{j-k}^{j+k} = q_{j-k}^{j+k}] \quad (13)$$

$$= \frac{p_{X_j, Q_{j-k}^{j+k}}(1, q_{j-k}^{j+k}) - p_{X_j, Q_{j-k}^{j+k}}(-1, q_{j-k}^{j+k})}{p_{Q_{j-k}^{j+k}}(q_{j-k}^{j+k})},$$

where $$p_{X_j, Q_{j-k}^{j+k}}(x, q_{j-k}^{j+k})$$

for $x \in \{-1, 1\}$ is defined in Equation (10), $$p_{Q_{j-k}^{j+k}}(q_{j-k}^{j+k})$$

is defined in Equation (11), and Equation (12) becomes $$p_{X_{j-k}^{j+k}}(x_{j-k}^{j+k}) = p(x_{j-k+1}, x_j - k) \prod_{i=-k}^{k-2} p(x_{j+i+2} \mid x_{j+i+1}, x_{j+i}).$$

It can be shown that $$MSE(\eta_{M4}, \sigma_v^2) = \mathbb{E}_{X_j, Q_{j-k}^{j+k}}\left[(X_j - \eta_{M4,j}(Q_{j-k}^{j+k}))^2\right] = \quad (14)$$

$$4 \int \frac{p_{X_j, Q_{j-k}^{j+k}}(-1, q_{j-k}^{j+k}) p_{X_j, Q_{j-k}^{j+k}}(1, q_{j-k}^{j+k})}{p_{Q_{j-k}^{j+k}}(q_{j-k}^{j+k})} dq_{j-k}^{j+k},$$

and $$\frac{\partial}{\partial q_j} \eta_{M4,j}(q_{j-k}^{j+k}) = 4 \frac{p_{X_j, Q_{j-k}^{j+k}}(-1, q_{j-k}^{j+k}) p_{X_j, Q_{j-k}^{j+k}}(1, q_{j-k}^{j+k})}{\left(\sigma_v p_{Q_{j-k}^{j+k}}(q_{j-k}^{j+k})\right)^2}.$$

If AMP with $\eta_{MConst}$ or $\eta_{M4}$ obeys SE, then the noise variance $\sigma_t^2$ should evolve according to Equation (4). As a consequence, the reconstruction error at iteration t can be predicted by evaluating Equation (9) or Equation (14) with $\sigma_v^2$ being replaced by $\sigma_t^2$.

Figure 2A:
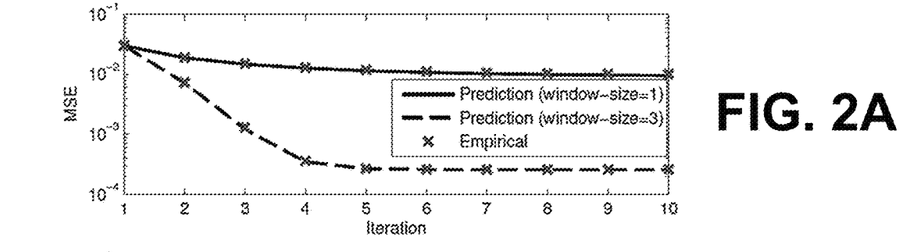
FIGS. 2A through 2C illustrate numerical verification of state evolution (SE) for AMP in accordance with various embodiments of the present disclosure.
Figure 2B:
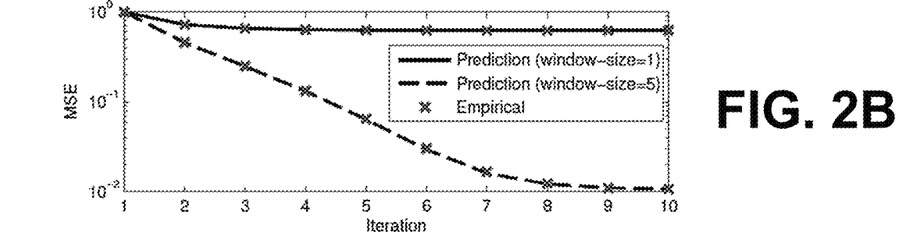

Numerical evidence: $\eta_{MConst}$ from Equation (8) can be applied within AMP for MConst signals, and $\eta_{M4}$ from Equation (13) can be applied within AMP for M4 signals. The window size $2k+1$ is chosen to be 1 or 3 for $\eta_{MConst}$, and 1 or 5 for $\eta_{M4}$. Note that when the window size is 1, $\eta_{MConst}$ and $\eta_{M4}$ become separable denoisers. The MSE predicted by SE is compared to the empirical MSE at each iteration where the input signal to noise ratio (SNR=10 $\log_{10}[(N\mathbb{E}[X^2])/(M\sigma_z^2)])$ is 5 dB for MConst and 10 dB for M4.

Referring to FIGS. 2A and 2B, shown are plots of MSE with respect to iteration for $\eta_{MConst}$ of Equation (8) and $\eta_{M4}$ of Equation (13), respectively. FIG. 2A illustrates the numerical verification of SE for AMP with $\eta_{MConst}$ when the input is an MConst signal (N=20000, R=0.4, SNR=10 dB) and FIG. 2B illustrates the numerical verification of SE for AMP with $\eta_{M4}$ when the input is an M4 signal (N=20000, R=0.4, SNR=10 dB). It is shown in FIGS. 2A and 2B for AMP with $\eta_{MConst}$ and $\eta_{M4}$ that the markers representing the empirical MSE track the lines predicted by SE, and that side-information from neighboring entries helps improve the MSE performance. The SE for AMP with $\eta_{MConst}$ at various measurement rates and noise levels was also examined and the numerical results verified the correctness of SE.

Figure 2C:
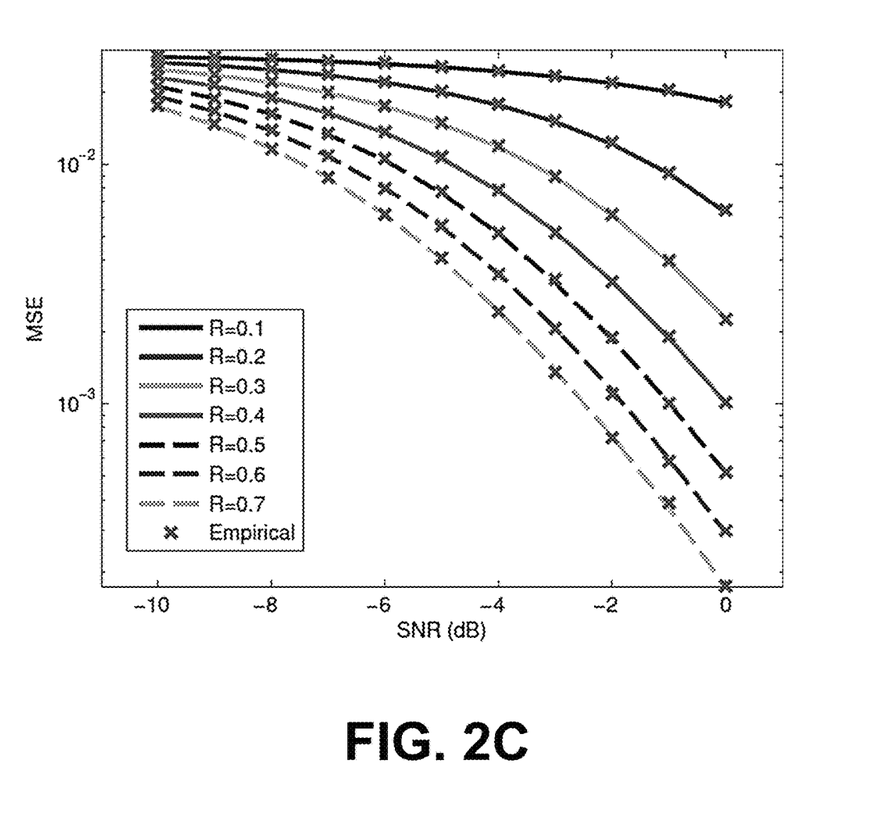

Referring next to FIG. 2C, numerical verification results of SE for AMP with $\eta_{MConst}$ of Equation (8) at various measurement rates (R) and noise levels (SNR) are shown. The lines predicted by SE and the markers (×) represent the empirical MSE (N=20,000). The markers that represent the empirical MSE lie on the lines predicted by SE, which further verifies the correctness of SE.

The SE results for the two Markov sources increased the confidence that AMP with non-separable denoisers for non-i.i.d. signals will track SE. This confidence motivated the application of a universal denoiser within AMP for CS reconstruction of stationary ergodic signals with unknown input statistics. Indeed, the numerical results show that AMP with a universal denoiser leads to a universal CS recovery algorithm.

I.I.D. Denoising Via Gaussian Mixture Fitting

Context quantization can map the non-i.i.d. sequence q into conditionally independent subsequences, so denoising the resulting i.i.d. subsequences will now be examined. The pdf of a Gaussian mixture (GM) has the form:

$$p(x) = \sum_{s=1}^{S} \alpha_s \mathcal{N}(x; \mu_s, \sigma_s^2), \quad (15)$$

where S is the number of Gaussian components, and $\Sigma_{s=1}^S \alpha_s = 1$ so that p(x) is a proper pdf.

A GM model may be fit for a given data sequence by starting with some arbitrarily large S, and inferring the structure of the mixture by letting the mixing probabilities $\alpha_s$ of some components be zero. This approach resembles the concept underlying the minimum message length (MML) criterion that selects the best overall model from the entire model space, which differs from model class selection based on the best model within each class. All models with the same number of components belong to one model class, and different models within a model class have different parameters for each component. A component-wise EM algorithm that updates ($\alpha_s$, $\mu_s$, $\sigma_s^2$) sequentially in s can be used to implement the MML-based approach. The main feature of the component-wise EM algorithm is that if $\alpha_s$ is estimated as 0, then the s-th component is immediately removed, and all the estimates in the maximization step are adjusted before moving to the expectation step.

To extend this to denoising, consider the scalar channel denoising problem defined in Equation (6) with an i.i.d. input. The input signal x can be estimated from its Gaussian noise corrupted observations q by posing a GM prior on x, and learning the parameters of the GM model with a modified version of the algorithm.

Initialization of EM: The EM algorithm must be initialized for each parameter, $\{\alpha_s, \mu_s, \sigma_s^2\}$, s=1, ..., S. One may choose to initialize the Gaussian components with equal mixing probabilities and equal variances, and the initial value of the means can be randomly sampled from the input data sequence, which in this case is the sequence of noisy observations q. However, in CS recovery problems, the input signal is often sparse, and it becomes difficult to correct the initial values if the initial values are far from the truth. To see why a poor initialization might be problematic, consider the following scenario: a sparse binary signal that contains a few ones and is corrupted by Gaussian noise is sent to the algorithm. If the initialization levels of the $\mu_s$'s are all around zero, then the algorithm is likely to fit one Gaussian component with near-zero mean and large variance rather than two narrow Gaussian components, one of which has mean close to zero while the other has mean close to one.

To address this issue, the initialization to examine the maximal distance between each symbol of the input data sequence and the current initialization of the $\mu_s$'s can be modified. If the distance is greater than $0.1\sigma_q$, then a Gaussian component whose mean is initialized as the value of the symbol being examined is added, where $\sigma_q^2$ is the estimated variance of the noisy observations q. It was found in the simulations that the modified initialization improves the accuracy of the density estimation, and speeds up the convergence of the EM algorithm.

Leverage side-information about the noise: Because it is known that each Gaussian component in $\hat{P}_Q$ should have variance no less than the noise variance $\sigma_v^2$, during the parameter learning process, if a component has variance that is significantly less than $\sigma_v^2$, it can be assumed that this low-variance component is spurious, and remove it from the mixture model. However, if the variance of the component is only slightly less than the noise variance $\sigma_v^2$, then the algorithm is allowed to keep tracking this component, and set the component variance to be equal to $\sigma_v^2$ at the end of the parameter learning process. That said, when subtracting the noise variance $\sigma_v^2$ from the Gaussian components of $\hat{P}_Q$ to obtain the components of $\hat{P}_X$, there may be components with zero-valued variance, which yields deltas in $\hat{P}_X$.

Denoising: Once the parameters in Equation (15) are estimated, a denoiser for i.i.d. signals can be defined as conditional expectation:

$$\eta_{iid}(q) = \mathbb{E}[X \mid Q = q] \quad (16)$$

$$= \sum_{s=1}^{S} \mathbb{E}[X \mid Q = q, \text{comp} = s] P(\text{comp} = s \mid Q = q)$$

$$= \sum_{s=1}^{S} \left( \frac{\sigma_s^2}{\sigma_s^2 + \sigma_v^2}(q - \mu_s) + \mu_s \right) \frac{\alpha_s \mathcal{N}(q; \mu_s, \sigma_s^2 + \sigma_v^2)}{\sum_{s=1}^{S} \alpha_s \mathcal{N}(q; \mu_s, \sigma_s^2 + \sigma_v^2)},$$

where comp is the component index, and $$\mathbb{E}[X \mid Q = q, \text{comp} = s] = \left( \frac{\sigma_s^2}{\sigma_s^2 + \sigma_v^2}(q - \mu_s) + \mu_s \right)$$

is the Wiener filter for component s.

Figure 3:
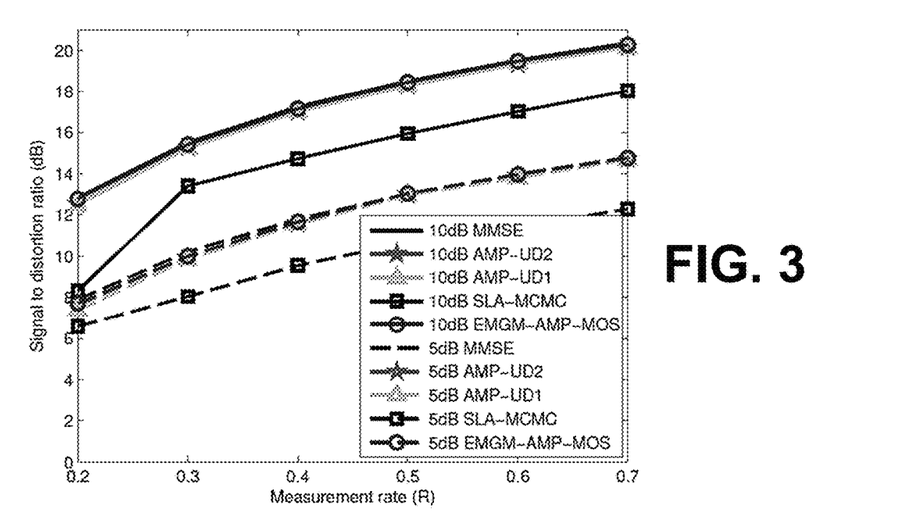
FIGS. 3 through 7 illustrate comparisons of AMP-UD with other recovery algorithms in accordance with various embodiments of the present disclosure.

It has been verified numerically for several distributions and low to moderate noise levels that the denoising results obtained by the GM-based i.i.d. denoiser of Equation (16) approach the Bayesian MMSE within a few hundredths of a dB. For example, the favorable reconstruction results for i.i.d. sparse Laplace signals in FIG. 3 show that the GM-based denoiser approaches the MMSE. FIG. 3 provides the signal to distortion ratio (SDR) for two AMP-UD implementations, SLA-MCMC, and EM-GM-AMP-MOS reconstruction results for the i.i.d. sparse Laplace signal as a function of measurement rate. Note that the SDR curves for the two AMP-UD implementations and EM-GM-AMP-MOS overlap the MMSE curve (N=10000, SNR=5 dB or 10 dB).

Universal Denoising

As has been described, an i.i.d. denoiser based on GM learning can denoise i.i.d. signals with unknown distributions. To reconstruct stationary ergodic signals that are not necessarily i.i.d., a universal denoising scheme may be used for bounded stationary ergodic signals based on context quantization, where a stationary ergodic signal is partitioned into i.i.d. subsequences. The context quantization scheme can be modified and the GM-based denoiser of Equation (16) applied to the i.i.d. subsequences, so that the universal denoiser can denoise unbounded stationary ergodic signals.

Consider the denoising problem of Equation (6), where the input x is stationary ergodic. The main idea of the context quantization scheme is to quantize the noisy symbols q to generate quantized contexts that are used to partition the unquantized symbols into subsequences. That is, given the noisy observations $q \in \mathbb{R}^N$, define the context of $q_j$ as $c_j = [q_{j-k}^{j-1}; q_{j+1}^{j+k}] \in \mathbb{R}^{2k}$ for j=1+k, ..., N−k, where [a; b] denotes the concatenation of the sequences a and b. For j<k or j>N−k+1, the median value $q_{med}$ of q is used as the missing symbols in the contexts. For example, $c_j = [q_{med}; q_1^{j-1}; q_{j+1}^{j+k}]$ for j=k. Vector quantization can then be applied to the context set $\mathcal{C} = \{c_j : j=1, \ldots, N\}$, and each $c_j$ is assigned a label $l_j = \{1, \ldots, L\}$ that represents the cluster that $c_j$ belongs to. Finally, the L subsequences that comprise symbols from q with the same label are obtained by taking $q^{(l)} = \{q_j : l_j = l\}$ for $l = \{1, \ldots, L\}$.

The symbols in each subsequence $q^{(l)}$ are regarded as approximately conditionally identically distributed given the common quantized contexts. The rationale underlying this concept is that a sliding-window denoiser uses information from the contexts to estimate the current symbol, and symbols with similar contexts in the noisy output of the scalar channel have similar contexts in the original signal. Therefore, symbols with similar contexts can be grouped together and denoised using the same denoiser. Note that a second subsequencing step may be used, which further partitions each subsequence into smaller subsequences such that a symbol in a subsequence does not belong to the contexts of any other symbols in this subsequence. This step ensures that the symbols within each subsequence are mutually independent, which is important for theoretical analysis. However, the design is motivated by short- to medium-length signals, and a small subsequence may not contain enough symbols to learn its empirical pdf well. Therefore, this second subsequencing step is omitted in these implementations.

In order to estimate the distribution of $x^{(l)}$, which is the clean subsequence corresponding to $q^{(l)}$, the pdf $\hat{P}_Q^{(L)}$ of $q^{(l)}$ may be first estimated via kernel density estimation. They then quantize the range that $x_j$'s take values from and the levels of the empirical distribution function of x, and find a quantized distribution function that matches $\hat{P}_Q^{(L)}$ well. Once the distribution function of $x^{(l)}$ is obtained, the conditional expectation of the symbols in the l-th subsequence can be calculated using Equation (7).

For error metrics that satisfy some mild technical conditions, a universal denoiser can asymptotically achieve, for stationary ergodic signals with bounded components, the optimal estimation error among all sliding-window denoising schemes despite not knowing the prior for the signal. When the error metric is square error, the optimal error is the MMSE.

One can denoise a stationary ergodic signal by (i) grouping together symbols with similar contexts; and (ii) applying an i.i.d. denoiser to each group. Such a scheme is optimal in the limit of large signal dimension N. However, existing denoisers within this scheme assume a bounded input, which might make it inapplicable to some real-world settings. In order to be able to estimate unbounded signals that take values from the entire real line, in step (ii), the GM learning algorithm can be applied for density estimation, and the conditional expectation computed with the estimated density as the i.i.d. denoiser.

Details about a modification made to step (i) are now provided. The context set $\mathcal{C}$ is acquired in the same way as described above. Because the symbols in the context $c_j \in \mathcal{C}$ that are closer in index to $q_j$ are likely to provide more information about $x_j$ than the ones that are located farther away, weights can be added to the contexts before clustering. That is, for each $c_j \in \mathcal{C}$ of length 2k, the weighted context is defined as $$c'_j = c_j \odot w$$

where $\odot$ denotes a point-wise product, and the weights take values, $$w_{k_i} = \begin{cases} e^{-\beta(k-k_i)}, & k_i = 1, \ldots, k \\ e^{-\beta(k_i-k-1)}, & k_i = k+1, \ldots, 2k \end{cases}, \quad (17)$$

for some $\beta \geq 0$. While in noisier channels, it might be necessary to use information from longer contexts, comparatively short contexts could be sufficient for cleaner channels. Therefore, the exponential decay rate $\beta$ is made adaptive to the noise level in a way such that $\beta$ increases with SNR. Specifically, $\beta$ is chosen to be linear in SNR:

$$\beta = b_1 \log_{10}((\|q\|_2^2/N - \sigma_v^2)/\sigma_v^2) + b_2, \quad (18)$$

where $b_1 > 0$ and $b_2$ can be determined numerically. The linear relation may be chosen because it is simple and fits well with the empirical optimal values for $\beta$; other choices for $\beta$ might be possible. The weighted context set $\mathcal{C}' = \{c'_j: j=1, \ldots, N\}$ is then sent to a k-means algorithm, and $q^{(l)}$'s are obtained according to the labels determined via clustering. The GM-based i.i.d. denoiser of Equation (16) can now be applied to each subsequence separately. However, one potential problem is that the GM fitting algorithm might not provide a good estimate of the model when the number of data points is small. Two approaches are proposed to address this small cluster issue.

Approach 1: Borrow members from nearby clusters. A post-processing step can be added to ensure that the pdf of $q^{(l)}$ is estimated from no less than T symbols. That is, if the size of $q^{(l)}$, which is denoted by B, is less than T, then T−B symbols in other clusters whose contexts are closest to the centroid of the current cluster are included to estimate the empirical pdf of $q^{(l)}$, while after the pdf is estimated, the extra symbols are removed, and only $q^{(l)}$ is denoised with the currently estimated pdf. The use of at least T symbols can help to avoid a poor estimate. UD with Approach 1 will be called "UD1." (A related approach utilizes k-nearest neighbors, where for each symbol in q, T symbols are found whose contexts are nearest to that of the current symbol and estimate its pdf from the T symbols. The k-nearest neighbors approach runs the GM learning algorithm N times in each AMP iteration, which significantly slows down the algorithm.)

Approach 2: Merge statistically similar subsequences. An alternative approach is to merge subsequences iteratively according to their statistical characterizations. The idea is to find subsequences with pdfs that are close in Kullback-Leibler (KL) distance, and decide whether merging them can yield a better model according to the minimum description length (MDL) criterion. Denote the iteration index for the merging process by h. After the k-means algorithm, a set of subsequences $\{q_h^{(l)}: l=1, \ldots, L_h\}$ is obtained, where $L_h$ is the current number of subsequences. A GM pdf $\hat{P}_{Q,h}^{(L)}$ is learned for each subsequence $q_h^{(l)}$. The MDL cost $c_h^{MDL}$ for the current model is calculated as:

$$c_h^{MDL} = -\sum_{l=1}^{L_h} \sum_{i=1}^{|q_h^{(l)}|} \log(\hat{p}_{Q,h}^{(l)}(q_{i,h}^{(l)})) + \sum_{l=1}^{L_h} \frac{3 \cdot m_h^{(l)}}{2} \log(|q_h^{(l)}|) + 2 \cdot L_h + L_0 \cdot \sum_{l=1}^{L_h} \frac{n_h^{(l)}}{L_0} \log\left(\frac{L_0}{n_h^{(l)}}\right),$$

where $q_{i,h}^{(l)}$ is the i-th entry of the subsequence $q_h^{(l)}$, $m_h^{(l)}$ is the number of Gaussian components in the mixture model for subsequence $q_h^{(l)}$, $L_0$ is the number of subsequences before the merging procedure, and $n_h^{(l)}$ is the number of subsequences in the initial set $\{q_0^{(l)}: l=1, \ldots, L_0\}$ that are merged to form the subsequence $q_h^{(l)}$. The four terms in $c_h^{MDL}$ are interpreted as follows. The first term is the negative log likelihood of the entire noisy sequence $q_h^{(l)}$, given the current GM models. The second term is the penalty for the number of parameters used to describe the model, where there are 3 parameters ($\alpha$, $\mu$, $\sigma^2$) for each Gaussian component, and $m_h^{(l)}$ components for the subsequence $q_h^{(l)}$. The third term arises from 2 bits that are used to encode $m_h^{(l)}$ for $l=1, \ldots, L_h$, because the numerical results have shown that the number of Gaussian components rarely exceeds four. In the fourth term, $$\sum_{l=1}^{L_h} \frac{n_h^{(l)}}{L_0} \log\left(\frac{L_0}{n_h^{(l)}}\right)$$

is the uncertainty that a subsequence from the initial set is mapped to $q_h^{(l)}$ with probability $n_h^{(l)}/L_0$, for $l=1, \ldots, L_h$.

Therefore, the fourth term is the coding length for mapping the $L_0$ subsequences from the initial set to the current set.

The KL distance between the pdf of $q_h^{(s)}$ and that of $q_h^{(t)}$ for $s,t=1, \ldots, L_h$, is then computed:

$$D(\hat{p}_{Q,h}^{(s)} \| \hat{p}_{Q,h}^{(t)}) = \int \hat{p}_{Q,h}^{(s)}(q) \log\left(\frac{\hat{p}_{Q,h}^{(s)}(q)}{\hat{p}_{Q,h}^{(t)}(q)}\right) dq.$$

A symmetric $L_h \times L_h$ distance matrix $D_h$ is obtained by letting its s-th row and t-th column be $$D(\hat{p}_{Q,h}^{(s)} \| \hat{p}_{Q,h}^{(t)}) + D(\hat{p}_{Q,h}^{(t)} \| \hat{p}_{Q,h}^{(s)}).$$

Suppose the smallest entry in the upper triangular part of $D_h$ (not including the diagonal) is located in the s*-th row and t*-th column, then $q_h^{(s*)}$ and $q_h^{(t*)}$ are temporarily merged to form a new subsequence, and a new GM pdf is learned for the merged subsequence. There now exists a new model with $L_{h+1}=L_h-1$ GM pdfs, and the MDL criterion $c_{h+1}^{MDL}$ is calculated for the new model. If $c_{h+1}^{MDL}$ is smaller than $c_h^{MDL}$, then the new model is accepted, and a new $L_{h+1} \times L_{h+1}$ distance matrix $D_{h+1}$ is calculated, otherwise the current model is kept, and the next smallest entry in the upper triangular part of the current $L_h \times L_h$ distance matrix $D_h$ is looked for. The number of subsequences is decreased by at most one after each iteration, and the merging process ends when there is only one subsequence left, or the smallest KL distance between two GM pdfs is greater than some threshold, which is determined numerically. UD with Approach 2 will be called "UD2."

UD2 was found to be more reliable than UD1 in terms of MSE performance, whereas UD1 was found to be more computationally efficient than UD2. This is because UD2 applies a more complicated (and thus slower) subsequencing procedure, which allows more accurate GM models to be fitted to subsequences.

Universal CS Recovery Algorithm

The three components that have been discussed can be combined to provide a universal CS recovery algorithm AMP-UD. Consider the linear inverse problem of Equation (1), where the input signal x is generated by a stationary ergodic source with unknown distributions. To estimate x from y given A, AMP as defined in Equations (2) and (3) can be applied. In each iteration, observations corrupted by AWGN, $q_t = x_t + A^T r_t = x + v$, are obtained, where $\sigma_v^2$ is estimated by $\hat{\sigma}_t^2$ of Equation (5). A subsequencing approach is applied to generate i.i.d. subsequences, where Approach 1 and Approach 2 offer two possible implementations. The GM-based i.i.d. denoiser of Equation (16) is then utilized to denoise each i.i.d. subsequence.

To obtain the Onsager correction term in Equation (3), the derivative of $\eta_{iid}$ of Equation (16) is calculated. For $q \in \mathbb{R}$, denoting $$f(q) = \sum_{s=1}^{S} \alpha_s \mathcal{N}(q; \mu_s, \sigma_s^2 + \sigma_v^2)\left(\frac{\sigma_s^2}{\sigma_s^2 + \sigma_v^2}(q - \mu_s) + \mu_s\right),$$

$$g(q) = \sum_{s=1}^{S} \alpha_s \mathcal{N}(q; \mu_s, \sigma_s^2 + \sigma_v^2),$$

we have that $$f'(q) = \sum_{s=1}^{S} \alpha_s \mathcal{N}(q; \mu_s, \sigma_s^2 + \sigma_v^2) \cdot \left(\frac{\sigma_s^2 + \mu_s^2 - q\mu_s}{\sigma_s^2 + \sigma_v^2} - \left(\frac{\sigma_s(q - \mu_s)}{\sigma_s^2 + \sigma_v^2}\right)^2\right),$$

$$g'(q) = \sum_{s=1}^{S} \alpha_s \mathcal{N}(q; \mu_s, \sigma_s^2 + \sigma_v^2)\left(-\frac{q - \mu_s}{\sigma_s^2 + \sigma_v^2}\right).$$

Therefore, $$\eta'_{iid}(q) = \frac{f'(q)g(q) - f(q)g'(q)}{(g(q))^2}. \tag{19}$$

It has been shown that the context quantization universal denoising scheme can asymptotically achieve the MMSE for bounded stationary ergodic signals. The scheme has been extended to unbounded signals, and the modified universal denoiser may asymptotically achieve the MMSE for unbounded stationary ergodic signals. AMP with MMSE-achieving separable denoisers has been shown to asymptotically achieve the MMSE in linear systems for i.i.d. inputs. Numerical evidence being presented shows that SE holds for AMP with Bayesian sliding-window denoisers. Bayesian sliding-window denoisers with proper window-sizes are MMSE-achieving non-separable denoisers. Given that the universal denoiser resembles a Bayesian sliding-window denoiser, the AMP-UD may asymptotically achieve the MMSE in linear systems for stationary ergodic inputs. Note that the window-size can be optimized for inputs of length N=10000 via numerical experiments. The window size should increase with N, and the optimal window size may be characterized.

Numerical Results

AMP-UD1 (AMP with UD1) and AMP-UD2 (AMP with UD2) were run in Matlab on a Dell OPTIPLEX 9010 running an Intel(R) Core™ i7-3770 with 16 GB RAM, and tested utilizing different types of signals, including synthetic signals and a chirp sound clip. The tests were carried out at various measurement rates and SNR levels. The input signal length N was 10000 for synthetic signals and 9600 for the chirp sound clip. The context size 2k was chosen to be 12, and the contexts were weighted according to Equations (17) and (18). The context quantization was implemented via the k-means algorithm. In order to avoid possible divergence of AMP-UD, a damping technique was employed to slow down the evolution. Specifically, damping was an extra step in the AMP iteration of Equation (3); instead of updating the value of $x_{t+1}$ by the output of the denoiser $\eta_t(A^T r_t + x_t)$, a weighted sum of $\eta_t(A^T r_t + x_t)$ and $x_t$ was taken as follows, $$x_{t+1} = \lambda \eta_t(A^T r_t + x_t) + (1-\lambda)x_t,$$

for some $\lambda \in (0, 1]$.

Parameters for AMP-UD1: The number of clusters L was initialized as 10, and may become smaller if empty clusters occur. The lower bound T on the number of symbols needed to learn the GM parameters was 256. The damping parameter $\lambda$ was set to 0.1, and 100 AMP iterations were run.

Parameters for AMP-UD2: The initial number of clusters was set to be 30, and these clusters were merged according to the scheme described. Because each time when merging occurs, the GM fitting algorithm is applied one more time to learn a new mixture model for the merged cluster, which is computationally demanding, adaptive damping was applied to reduce the number of iterations needed. The damping parameter was initialized to be 0.5, and was increased (or decreased) within the range of [0.01, 0.5] if the value of the scalar channel noise estimator $\hat{\sigma}_r^2$ of Equation (5) decreased (or increased).

The recovery performance was evaluated by signal to distortion ratio (SDR=10 $\log_{10}[\mathbb{E}[X^2]/\text{MSE}]$), where the MSE is averaged over 50 random draws of x, A, and z.

The performance of the two AMP-UD implementations was compared to (i) the universal CS recovery algorithm SLA-MCMC; and (ii) the empirical Bayesian message passing approaches EM-GM-AMP-MOS for i.i.d. inputs and turboGAMP for non-i.i.d. inputs. Note that EM-GM-AMP-MOS assumes that during recovery the input is i.i.d., whereas turboGAMP is designed for non-i.i.d. inputs with a known statistical model. The results for other CS algorithms such as compressive sensing matching pursuit (CoSaMP), gradient projection for sparse reconstruction (GPSR), or $l_1$ minimization, have not been included because their SDR performance is consistently weaker than the three algorithms being compared.

Sparse Laplace signal (i.i.d.): The i.i.d. sparse Laplace signals that were tested follow the distribution $p_X(x)=0.03\,\mathcal{L}(0,1)+0.97\delta(x)$, where $\mathcal{L}(0,1)$ denotes a Laplacian distribution with mean zero and variance one, and $\delta(\cdot)$ is the delta function. It is shown in FIG. 3 that the two AMP-UD implementations and EM-GM-AMP-MOS achieve the MMSE, whereas SLA-MCMC has weaker performance, because the MCMC approach is expected to sample from the posterior and its MSE is twice the MMSE.

Figure 4:
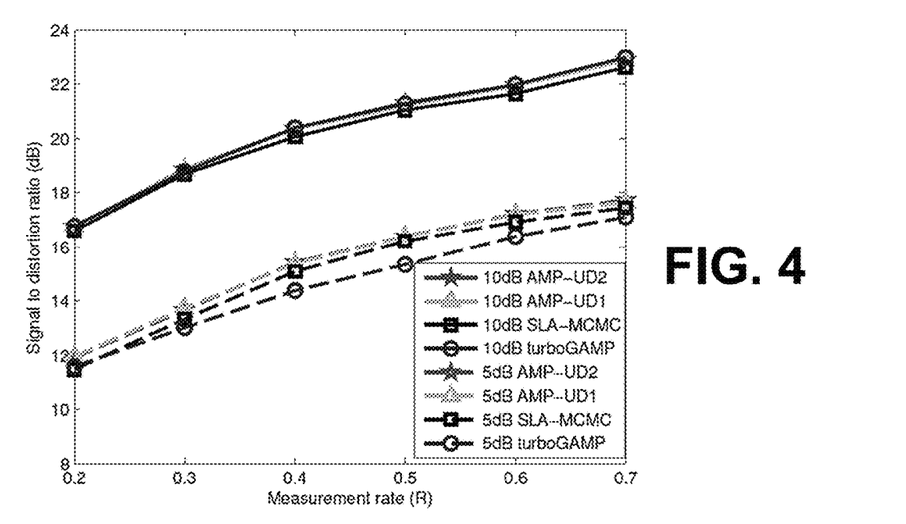

Markov-uniform signal: Consider the two-state Markov state machine described above, with $p_{01}=3/970$ and $p_{10}=1/10$. Markov-uniform signal (MUnif for short) follows a uniform distribution U[0,1] at the nonzero state $s_1$. These parameters lead to 3% nonzero entries in a MUnif signal on average. FIG. 4 compares the two AMP-UD implementations, SLA-MCMC, and turboGAMP reconstruction results for the two-state Markov signal with nonzero entries drawn from the uniform distribution U[0,1] as a function of measurement rate. Note that the SDR curves for the two AMP-UD implementations overlap at SNR=5 dB, and they both overlap turboGAMP at SNR=10 dB (N=10000, SNR=5 dB or 10 dB). It is shown in FIG. 4 that at low SNR, the two AMP-UD implementations achieve higher SDR than SLA-MCMC and turboGAMP. At high SNR, the two AMP-UD implementations and turboGAMP have similar SDR performance, and are slightly better than SLA-MCMC. The turboGAMP needs side information about the Markovian structure of the signal, whereas the two AMP-UD implementations and SLA-MCMC do not.

Figure 5:
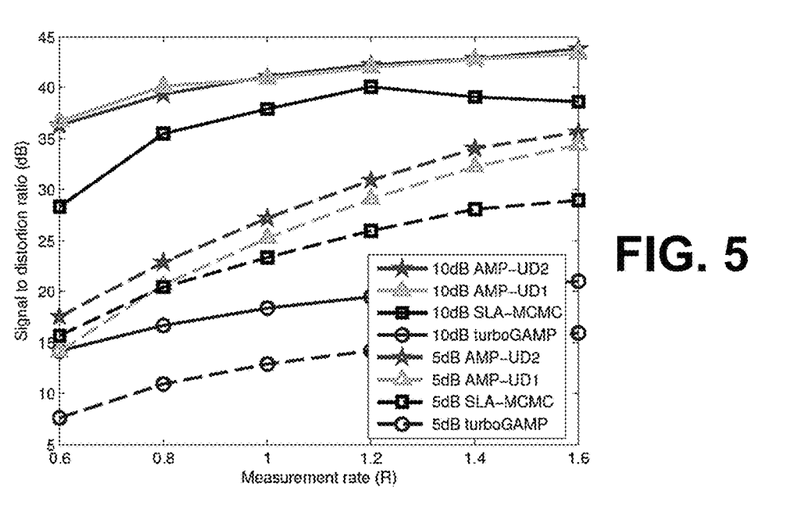

Dense Markov-Rademacher signal: Consider the two-state Markov state machine described above with $p_{01}=3/70$ and $p_{10}=1/10$. A dense Markov Rademacher signal (MRad for short) takes values from {−1, +1} with equal probability at $s_1$. These parameters lead to 30% nonzero entries in an MRad signal on average. Because the MRad signal is dense (non-sparse), it was measured with somewhat larger measurement rates and SNRs than before. FIG. 5 compares the AMP-UD implementations, SLA-MCMC, and turboGAMP reconstruction results for the dense two-state Markov signal with nonzero entries drawn from a Rademacher (±1) distribution as a function of measurement rate (N=10000, SNR=10 dB or 15 dB). It is shown in FIG. 5 that the two AMP-UD implementations and SLA-MCMC have better overall performance than turboGAMP. AMP-UD 1 outperforms SLA-MCMC except for the lowest tested measurement rate at low SNR, whereas AMP-UD2 outperforms SLA-MCMC consistently.

Figure 6:
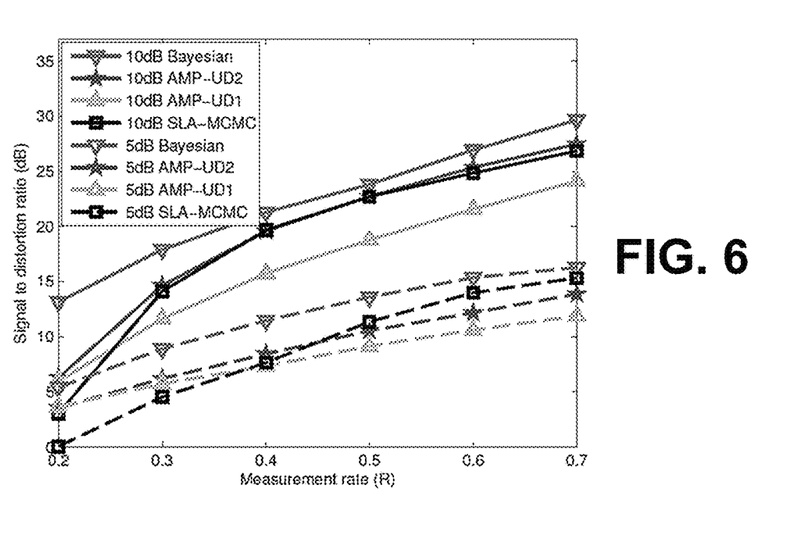

Four-state Markov signal (M4): Reconstruction of the signal described above was attempted using turboGAMP and existing sparsity-promoting algorithms such as GPSR and CoSaMP (provided with a carefully chosen sparsifying matrix), but they could not achieve an SDR greater than 5 dB. Therefore, only the results of the two AMP-UD implementations and SLA-MCMC are compared. FIG. 6 shows the two AMP-UD implementations, AMP with $\eta_{M4}$ of Equation (13), and SLA-MCMC reconstruction results for the four-state Markov signal as a function of measurement rate (N=10000, SNR=5 dB or 10 dB). It is shown in FIG. 6 that AMP-UD2 achieves similar or slightly better SDR than SLA-MCMC at high SNR, whereas at low SNR, AMP-UD2 and SLA-MCMC take the lead at lower measurement rates and at higher measurement rates, respectively. AMP-UD 1 did not achieve satisfactory results for this signal, owing to poor selection of the subsequences.

Additionally, results by applying the Bayesian sliding-window denoiser consistently outperformed SLA-MCMC. It has been shown that the MSE of the context quantization based universal denoising scheme can approach that of the optimal sliding-window scheme asymptotically. A more advanced AMP-UD implementation may approach the SDR achieved by AMP with the Bayesian-sliding window denoiser, and thus could outperform SLA-MCMC consistently.

Figure 7:
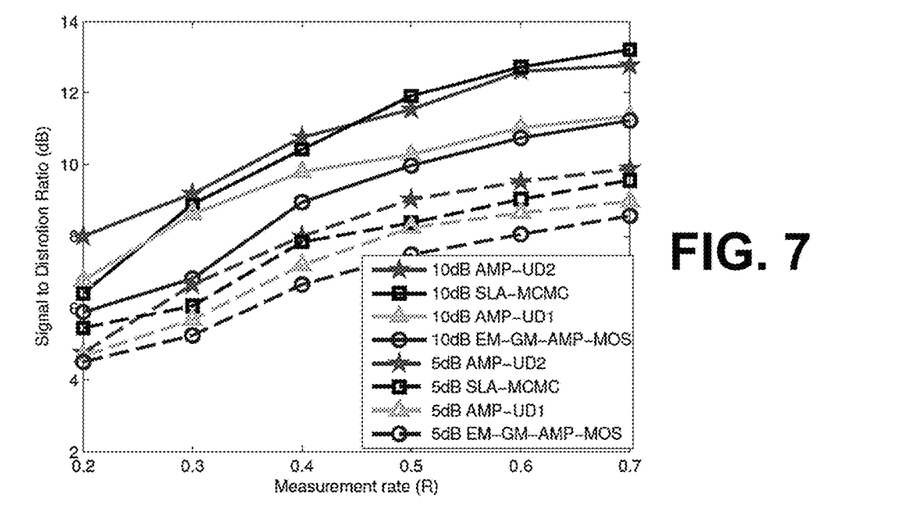

Chirp sound clip: The experiments up to this point used synthetic signals. The reconstruction quality of AMP-UD is now evaluated for a real world signal. The "chirp" sound clip from Matlab was used. A segment with length 9600 was cut out of the "chirp" (denoted by x) and performed a short-time discrete cosine transform (DCT) with window size, number of DCT points, and hop size all being 32. The resulting short-time DCT coefficients matrix was then vectorized to form a coefficient vector θ of length 9600. Denoting the short-time DCT matrix by $W^{-1}$, then $\theta=W^{-1}x$. Therefore, Equation (1) can be rewritten as $y=\Phi\theta+z$, where $\Phi=AW$. The goal is to reconstruct θ from the measurements y and the matrix Φ. After the estimated coefficient vector $\hat{\theta}$ was obtained, the estimated signal was calculated as $\hat{x}=W\hat{\theta}$. Although the coefficient vector θ may exhibit some type of memory, it is not readily modeled in closed form, and so a valid model for turboGAMP is not provided. Therefore, EM-GM-AMP-MOS was used instead of turboGAMP. The SDRs for the reconstruction results for a chirp sound clip by the two AMP-UD implementations, SLA-MCMC and EM-GM-AMP-MOS as a function of measurement rate are plotted in FIG. 7 (N=9600, SNR=5 dB or 10 dB.), where it can be seen that both AMP-UD implementations and SLA-MCMC outperform EM-GM-AMP-MOS consistently, which implies that the simple i.i.d. model is suboptimal for this real world signal. AMP-UD2 provides comparable and in many cases higher SDR than SLA-MCMC. AMP-UD 1 was the fastest among the four algorithms, but it has lower reconstruction quality than AMP-UD2 and SLA-MCMC, owing to poor selection of the subsequences.

Runtime: The runtime of AMP-UD1 and AMP-UD2 for MUnif, M4, and MRad was typically under 5 minutes and 10 minutes, respectively, but somewhat more for signals such as sparse Laplace and the chirp sound clip that require a large number of Gaussian components to be fit. For comparison, the runtime of SLA-MCMC is typically an hour, whereas typical runtimes of EM-GM-AMP-MOS and turboGAMP were 30 minutes.

A universal CS recovery algorithm (AMP-UD) that applies a universal denoiser (UD) within approximate message passing (AMP) has been disclosed. AMP-UD is designed to reconstruct stationary ergodic signals from noisy linear measurements. The performance of two AMP-UD implementations were evaluated via simulations, where it was shown that AMP-UD achieves favorable signal to distortion ratios compared to existing algorithms, and that its runtime is typically faster.

AMP-UD combines three existing schemes: (i) AMP; (ii) universal denoising; and (iii) a density estimation approach based on Gaussian mixture fitting. In addition to the algorithmic framework, three specific contributions are provided. First, numerical results show that SE holds for non-separable Bayesian sliding-window denoisers. Second, the GM learning algorithm was modified, and extended to an i.i.d. denoiser. Third, a universal denoiser that does not need the input signal to be bounded was designed. Two implementations of the universal denoiser were provided, with one being faster and the other achieving better reconstruction quality in terms of signal to distortion ratio.

Example of Processing System

Figure 8:
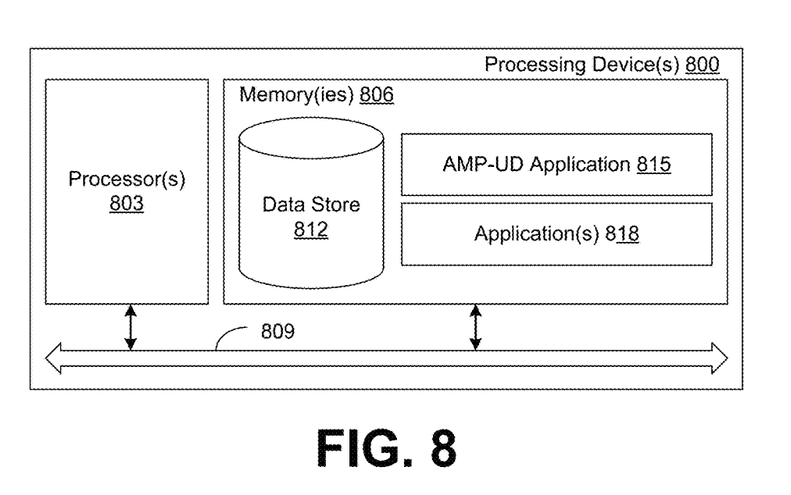
FIG. 8 is a schematic block diagram of a processing device in accordance with various embodiments of the present disclosure.

With reference to FIG. 8, shown is a schematic block diagram of a processing device 800 according to various embodiments of the present disclosure. The processing device 800 includes at least one processor circuit, for example, having a processor 803 and a memory 806, both of which are coupled to a local interface 809. To this end, the processing device 800 can comprise, for example, at least one computer or like device, which may be used to control radar transmissions. The local interface 809 can comprise, for example, a data bus with an accompanying address/control bus or other bus structure as can be appreciated.

Stored in the memory 806 are both data and several components that are executable by the processor 803. In particular, stored in the memory 806 and executable by the processor 803 may be an AMP-UD application 815 and/or other applications 818. Also stored in the memory 806 can be a data store 812 and other data. In addition, an operating system can be stored in the memory 806 and executable by the processor 803.

It is understood that there can be other applications that are stored in the memory 806 and are executable by the processor 803 as can be appreciated. Where any component discussed herein is implemented in the form of software, any one of a number of programming languages can be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs can be, for example, a compiled program that can be translated into machine code in a format that can be loaded into a random access portion of the memory 806 and run by the processor 803, source code that can be expressed in proper format such as object code that is capable of being loaded into a random access portion of the memory 806 and executed by the processor 803, or source code that can be interpreted by another executable program to generate instructions in a random access portion of the memory 806 to be executed by the processor 803, etc. An executable program can be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, the processor 803 can represent multiple processors 803 and the memory 806 can represent multiple memories 806 that operate in parallel processing circuits, respectively. In such a case, the local interface 809 can be an appropriate network that facilitates communication between any two of the multiple processors 803, between any processor 803 and any of the memories 806, or between any two of the memories 806, etc. The local interface 809 can comprise additional systems designed to coordinate this communication, including, for example, performing load balancing. The processor 803 can be of electrical or of some other available construction.

Although the AMP-UD application 815, application(s) 818, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the AMP-UD application 815 and/or application(s) 818, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including, for example, static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A method comprising:
applying, using processing circuitry including a processor and memory, an approximate message passing (AMP) conversion framework to a plurality of substantially linear measurements to produce a plurality of scalar measurements;
applying, using the processing circuitry, a denoiser algorithm to the plurality of scalar measurements to generate a plurality of denoised scalar measurements, where the denoiser algorithm is a universal denoiser algorithm that is agnostic to input statistics of the plurality of scalar measurements and denoises as well based on error metric criteria comprising at least one of squared error, ell infinity ($l_\infty$) error, ell1 ($l_1$) error, and ell_p ($l_p$) error; and
applying, using the processing circuitry, a conversion term to the plurality of denoised scalar measurements to convert the plurality of denoised scalar measurements to a plurality of denoised substantially linear measurements.

2. The method of claim 1, wherein the universal denoiser algorithm involves context quantization for subsequencing, where subsequences are denoised using a denoiser designed for independent and identically distributed subsequences.

3. The method of claim 2, further comprising weighting the contexts prior to context quantization.

4. The method of claim 2, wherein the denoiser designed for independent and identically distributed subsequences comprises density function estimation followed by an optimal Bayesian algorithm for denoising signals with that density function.

5. The method of claim 4, wherein the optimal Bayesian algorithm is optimized for p-norm errors.

6. The method of claim 4, wherein the density function is a mixture model.

7. The method of claim 2, further comprising estimating a density function of the current subsequence based at least in part upon symbols from other subsequences, and denoising the current subsequence using the density function.

8. The method of claim 7, wherein the symbols from other subsequences comprise symbols whose contexts are similar to the contexts corresponding to symbols of the current subsequence.

9. The method of claim 8, wherein weights of the symbols decay exponentially or linearly based on how far the symbol is from the middle of the context.

10. The method of claim 9, wherein a rate of decay of the weights is a function of an estimated signal to noise ratio.

11. The method of claim 2, further comprising merging statistically similar subsequences prior to independent and identically distributed subsequence denoising.

12. The method of claim 11, wherein a statistical similarity measure of the statistically similar subsequences is measured using empirical distributions of two subsequences.

13. The method of claim 12, wherein the statistical similarity measure is a Kullback Leibler divergence or a symmetric version thereof.

14. The method of claim 12, wherein the statistical similarity measure is an $l_1$ distance.

15. The method of claim 11, further comprising a model selection criterion to compare a current model and a new model after merging, and accepting or rejecting the merging based upon the comparison.

16. The method of claim 15, wherein the model selection criterion is a minimum description length criterion.

17. The method of claim 2, wherein the context quantization involves clustering using a k-means algorithm.

18. The method of claim 1, wherein a generalized approximate message passing (GAMP) framework is used to account for one or more noise distributions.

19. The method of claim 18, wherein the one or more noise distributions is estimated empirically.

20. The method of claim 1, wherein the applied denoising algorithm is a sliding window denoiser.

* * * * *